(12) United States Patent
Yoshida et al.

(10) Patent No.: US 10,553,859 B2
(45) Date of Patent: Feb. 4, 2020

(54) ELECTRODE ACTIVE MATERIAL FOR NONAQUEOUS ELECTROLYTE SECONDARY BATTERY, AND NONAQUEOUS ELECTROLYTE SECONDARY BATTERY

(71) Applicant: DENSO CORPORATION, Kariya, Aichi-pref. (JP)

(72) Inventors: Shuhei Yoshida, Kariya (JP); Koji Ohira, Kariya (JP); Masaki Uchiyama, Kariya (JP); Daisuke Shibata, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 140 days.

(21) Appl. No.: 15/133,250

(22) Filed: Apr. 20, 2016

(65) Prior Publication Data

US 2016/0315316 A1 Oct. 27, 2016

(30) Foreign Application Priority Data

Apr. 27, 2015 (JP) .................................. 2015-90557

(51) Int. Cl.
*H01M 4/36* (2006.01)
*H01M 4/48* (2010.01)
(Continued)

(52) U.S. Cl.
CPC .......... *H01M 4/366* (2013.01); *H01M 4/625* (2013.01); *H01M 4/485* (2013.01); *H01M 10/0525* (2013.01)

(58) Field of Classification Search
None
See application file for complete search history.

(56) References Cited

U.S. PATENT DOCUMENTS 5,686,203 A * 11/1997 Idota ..................... H01M 4/485
429/218.1
6,528,033 B1 3/2003 Barker et al.
(Continued)

FOREIGN PATENT DOCUMENTS

JP 2000-243396 A 9/2000
JP 2004-259470 A 9/2004
(Continued)

OTHER PUBLICATIONS

Chi et al, Optimizing the Carbon Coating on LiFePO4 for Improved Battery Performance, 4 RSC Adv 7795-98 (Jan. 2014).*
(Continued)

*Primary Examiner* — Yoshitoshi Takeuchi
(74) *Attorney, Agent, or Firm* — Harness, Dickey & Pierce, P.L.C.

(57) ABSTRACT

An electrode active material for a nonaqueous electrolyte secondary battery includes: a core part including at least one of an inorganic oxide and a carbon-composite inorganic composite oxide; and a shell part for carbon coating on the core part. The electrode active material has a specific surface area of 6.0 m²/g or more. The electrode active material has a moisture content of 400 ppm or less, which is measured by a Karl Fischer method such that the electrode active material is heated in a heat-evaporating manner, and continuously maintained at 250° C. for 40 minutes without exposing to an atmosphere after the electrode active material is exposed to the atmosphere to absorb moisture to be saturated.

8 Claims, 2 Drawing Sheets

(51) Int. Cl.
*H01M 4/485* (2010.01)
*H01M 4/505* (2010.01)
*H01M 4/52* (2010.01)
*H01M 4/525* (2010.01)
*H01M 4/54* (2006.01)
*H01M 4/56* (2006.01)
*H01M 4/57* (2006.01)
*H01M 4/62* (2006.01)
*H01M 10/0525* (2010.01)

(56) References Cited

U.S. PATENT DOCUMENTS

| | | |
|---|---|---|
| 6,962,666 B2 | 11/2005 | Ravet et al. |
| 7,344,659 B2 | 3/2008 | Ravet et al. |
| 7,457,018 B2 | 11/2008 | Armand et al. |
| 2003/0129494 A1 | 7/2003 | Kaneda et al. |
| 2006/0068287 A1* | 3/2006 | Morita ............... H01M 4/134 429/223 |
| 2006/0257746 A1 | 11/2006 | Inagaki et al. |
| 2007/0031732 A1* | 2/2007 | Chiang ............... C01B 25/45 429/231.95 |
| 2010/0178570 A1 | 7/2010 | Kozono et al. |
| 2011/0300447 A1* | 12/2011 | Archer ............... B82Y 30/00 429/231.8 |
| 2012/0077670 A1* | 3/2012 | Morishita ............... B01J 21/18 502/182 |
| 2014/0295289 A1 | 10/2014 | Takami et al. |
| 2014/0323414 A1 | 10/2014 | Tal et al. |

FOREIGN PATENT DOCUMENTS

| | | |
|---|---|---|
| JP | 2004-259471 A | 9/2004 |
| JP | 2006-221881 A | 8/2006 |
| JP | 2006-318797 A | 11/2006 |
| JP | 2010-228980 A | 10/2010 |
| JP | 2011-113924 A | 6/2011 |
| JP | 2013-229341 A | 11/2013 |
| JP | 2014-019617 A | 2/2014 |
| JP | 2014-192154 A | 10/2014 |
| JP | 2014-533746 A | 12/2014 |

OTHER PUBLICATIONS

Fattakhova et al., "Solvothermal synthesis and electrochemical behavior of nanocrystalline cubic Li—Ti—O oxides with cationic disorder", Solid State Ionics 176 (2005) 1877-1885, www.sciencedirect.com, Received date: Jul. 26, 2014.

Kostlanova et al., "The effect of the inner particle structure on the electronic structure of the nano-crystalline Li—Ti—O spinels", Electrochimica Acta 52 (2007) 1847-1856, www.sciencedirect.com, Received date: Mar. 27, 2006.

* cited by examiner

FIG. 3

ELECTRODE ACTIVE MATERIAL FOR NONAQUEOUS ELECTROLYTE SECONDARY BATTERY, AND NONAQUEOUS ELECTROLYTE SECONDARY BATTERY

CROSS REFERENCE TO RELATED APPLICATION

This application is based on Japanese Patent Application No. 2015-90557 filed on Apr. 27, 2015, the disclosure of which is incorporated herein by reference.

TECHNICAL FIELD

The present disclosure relates to an electrode active material for a nonaqueous electrolyte secondary battery and also to a nonaqueous electrolyte secondary battery.

BACKGROUND

With the spread of laptop computers, mobile phones, digital cameras, and the like, the demand for secondary batteries for driving these small-sized electronic devices has been expanding. Further, for these electronic devices, non-aqueous electrolyte secondary batteries (particularly lithium ion secondary batteries) have been increasingly used for their capability to achieve high capacity.

In addition to the use for small-sized electronic devices, the application of nonaqueous electrolyte secondary batteries for vehicles (EV, HV, PHV), household power supplies (HEMS), and the like, where a large amount of electric power is required, has also been considered. In this case, in an attempt to obtain a large amount of electric power, the electrode plates of a nonaqueous electrolyte secondary battery are increased in size, a large number of electrode plates are laminated to form an electrode assembly, or a large number of battery cells are assembled to form an assembled battery, for example.

In a nonaqueous electrolyte secondary battery, generally, a positive electrode plate and a negative electrode plate are laminated with a separator therebetween and housed in a case together with a nonaqueous electrolyte. The electrode plates (positive electrode plate, negative electrode plate) are each formed in a predetermined shape by applying a paste containing an electrode active material (positive electrode active material, negative electrode active material) onto the surface of a current collector made of an electrically conductive metal (metal foil), followed by drying.

In such a nonaqueous electrolyte secondary battery, when moisture is present inside the system (inside the case), with the progress of the cell reaction, gas may be generated as a side reaction.

As a technique to deal with the problem of gas generation, PTL 1 describes the formation of a coating film on the surface of the negative electrode from an additive added to the nonaqueous electrolyte.

A lithium metal oxide, which is used as an electrode active material for a nonaqueous electrolyte secondary battery, has highly Lewis basic oxygen atoms on the surface thereof. When oxygen atoms are highly Lewis basic, they are likely to react with moisture in the air (in the atmosphere). As a result of the reaction with moisture, a large number of hydroxyl groups are formed, making the binding to water (hydrogen bond) strong. Such bound water has been difficult to remove by drying for battery production (e.g., heating at 150° C. or less).

Of lithium metal oxides used as electrode active materials, metal oxides having an olivine structure (positive electrode active materials) and spinel-type lithium titanates (negative electrode active materials) have low diffusion coefficients. Therefore, it has been necessary to form such a metal oxide into nano-sized particles. This results in an increase in the specific surface area, making the problem of the reaction with moisture more prominent.

In order to ensure the electrical conductivity of an electrode active material, a technique in which a carbon composite or a carbon coating is formed on the surface of a lithium metal oxide to serve as an electrode active material has been known. In this electrode active material, it appears that the contact between the surface of the electrode active material and moisture in the atmosphere can also be prevented.

As a technique for coating the surface of an electrode active material with carbon, there is a method in which an electron-conducting substance made of an organic polymer (precursor) is mixed with particles of an electrode active material, and then the mixture is subjected to a thermal decomposition reaction to form an electron-conducting coating film.

PTL 2 describes the formation of a carbon coating film on the surface of an electrode active material (negative electrode active material: lithium titanate) using a heat treatment.

However, it has been confirmed that although the related art in which the surface of an electrode active material is coated with carbon has an improving effect on electrical conductivity, the adsorption of moisture cannot be reduced. That is, a nonaqueous electrolyte secondary battery using this electrode active material still has the problem of gas generation.

The origin of this problem is that with the related art in which the surface of an electrode active material is coated with carbon, it is difficult to uniformly coat the surface with carbon. That is, a uniform carbon coating cannot be formed, and, as a result, the electrode active material remains partially exposed, resulting in contact with moisture in the atmosphere to cause gas production.

PTL 1: JP-2013-229341 A (corresponding to US 2010/0178570 A1)

PTL 2: JP-2006-221881 A

SUMMARY

It is an object of the present disclosure to provide an electrode active material for a nonaqueous electrolyte secondary battery, which makes it possible to obtain a nonaqueous electrolyte secondary battery in which gas generation is suppressed. It is another object of the present disclosure to provide nonaqueous electrolyte secondary battery.

According to a first aspect of the present disclosure, an electrode active material for a nonaqueous electrolyte secondary battery includes: a core part including at least one of an inorganic oxide and a carbon-composite inorganic composite oxide; and a shell part for carbon coating on the core part. The electrode active material has a specific surface area of 6.0 m$^2$/g or more. The electrode active material has a moisture content of 400 ppm or less, which is measured by a Karl Fischer method such that the electrode active material is heated in a heat-evaporating manner, and continuously maintained at 250° C. for 40 minutes without exposing to an atmosphere after the electrode active material is exposed to the atmosphere to absorb moisture to be saturated.

Because of the above configuration, the electrode active material of the disclosure has a reduced moisture content. In particular, the amount of moisture adsorbed by the core part of the electrode active material is small. As a result, gas generation caused by the reaction of contained moisture is suppressed, and a decrease in the safety of a secondary battery using the electrode active material is suppressed.

According to a second aspect of the present disclosure, a nonaqueous electrolyte secondary battery includes the electrode active material for a nonaqueous electrolyte secondary battery according to the first aspect of the present disclosure.

The above nonaqueous electrolyte secondary battery exerts an effect obtained by the electrode active material according to the first aspect of the present disclosure.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

In order to solve the above difficulties, the present inventors have conducted extensive studies about the shell part of an electrode active material having a core-shell structure. As a result, they have accomplished the disclosure.

Hereinafter, embodiments of the electrode active material for a nonaqueous electrolyte secondary battery and the nonaqueous electrolyte secondary battery of the disclosure as an electrode active material for a lithium ion secondary battery and a lithium ion secondary battery using the same will be described in detail with reference to the drawings.

First Embodiment

The present mode is a mode in which the electrode active material of the disclosure is used as a positive electrode active material.

Figure 1:
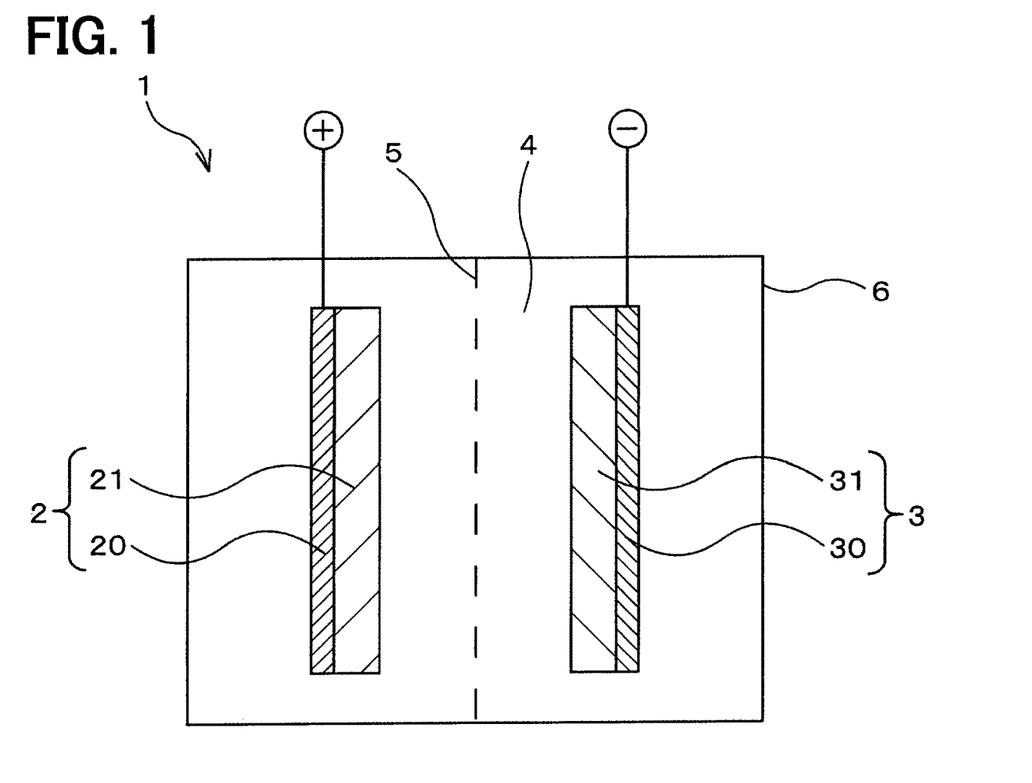
FIG. 1 schematically shows the configuration of a lithium ion secondary battery 1 of a first embodiment.

The secondary battery of the present mode is a lithium ion secondary battery 1 whose configuration is schematically shown in FIG. 1. The lithium ion secondary battery 1 includes a positive electrode 2, a negative electrode 3, and a nonaqueous electrolyte 4.

[Positive Electrode]

The positive electrode 2 contains a positive electrode active material. The positive electrode 2 includes a positive electrode active material layer 21 containing the positive electrode active material on the surface of a positive current collector 20. The positive electrode active material layer 21 is formed by applying a positive electrode mixture obtained by mixing the positive electrode active material, an electrically conductive material, and a binding material to the surface of the positive current collector 20, followed by drying. The positive electrode mixture is in the form of a paste (slurry) with a suitable solvent.

(Positive Electrode Active Material)

The positive electrode active material includes: a core part including at least either an inorganic oxide or a carbon-composite inorganic composite oxide; and a shell part formed of a carbon coating on the core part. Because the core part having low electrical conductivity is coated with carbon having high electrical conductivity (the formation of a shell part), this positive electrode active material has improved electrical conductivity (electron conductivity). In addition, at the portion where the core part is coated with the shell part, the shell part is not exposed. Accordingly, further adsorption of moisture by the core part can be prevented.

The core part includes at least either an inorganic oxide or a carbon-composite inorganic composite oxide (hereinafter referred to as positive electrode composite oxide). This positive electrode composite oxide functions as a positive electrode active material for a secondary battery.

The specific composition of the positive electrode composite oxide (inorganic oxide, carbon-composite inorganic composite oxide) is not limited. It may be a composite oxide conventionally used as a positive electrode active material for a lithium ion secondary battery (nonaqueous electrolyte secondary battery).

Examples of positive electrode composite oxides (inorganic oxides) include inorganic oxides having a polyanion structure and lithium silicate compounds.

The inorganic oxide having a polyanion structure may be $Li_\alpha M_\rho X_\eta O_{4-\gamma} Z_\gamma$, for example. (Incidentally, M: at least one member selected from Mn, Co, Ni, Fe, Cu, Cr, Mg, Ca, Zn, and Ti, X: at least one member selected from P, As, Si, Mo, and Ge, Z: at least one member selected from Al, Mg, Ca, Zn, and Ti; they may be arbitrarily contained. $0<\alpha \leq 2.0$, $0 \leq \beta < 1.5$, $1 \leq \eta \leq 1.5$, $0 \leq \gamma \leq 1.5$.) Among them, $LiFe_xPO_4$ and $LiMn_{1-x}Fe_xPO_4$ ($0 \leq x < 0.5$, Mn>Fe) are more preferable.

The positive electrode composite oxide may include two or more kinds having different compositions within the ranges shown in the above compositional formula.

The positive electrode 2 may contain only the above positive electrode composite oxide as a positive electrode active material, or may also contain a mixture with an additional positive electrode active material. The additional positive electrode active material is a substance conventionally used as a positive electrode active material for a lithium ion secondary battery. Examples of positive electrode active materials conventionally used for a lithium ion secondary battery include various oxides, sulfides, lithium-containing oxides, and electrically conductive polymers. Lithium-transition metal composite oxides are preferable.

Examples of lithium-transition metal composite oxides include composite oxides that satisfy ($0 \leq \alpha \leq 2.0$, $0 \leq \beta \leq 1.5$, $1 \leq \eta \leq 1.5$, $0 \leq \gamma \leq 1.5$) in the above compositional formula.

The additional positive electrode active material herein may have a polyanion structure or a structure other than a polyanion structure. Examples thereof include oxides having a layered structure represented by $LiNi_{1/3}Co_{1/3}Mn_{1/3}O_2$. Such an oxide has low reactivity with water (hardly absorbs water). Accordingly, it is preferable that the additional positive electrode active material has low water absorbency and it is more preferable that the material does not react with moisture.

In the case where the positive electrode 2 contains a mixture of the above positive electrode composite oxide and the additional positive electrode active material, the mixing ratio is not limited as long as the below-mentioned moisture content can be satisfied. It is preferable that the above positive electrode composite oxide is rich. That is, it is preferable that when the total number of Li atoms in the positive electrode active materials is taken as 100%, the number of Li atoms in the above positive electrode composite oxide is 50% or more. In addition, it is preferable that when the total mass of the positive electrode active materials is taken as 100 mass %, the mass of the above positive electrode composite oxide is 50 mass % or more.

In the positive electrode active material, production methods for the above positive electrode composite oxide and the additional positive electrode active material are not limited, and they can be produced using known production methods. The positive electrode composite oxide and the additional positive electrode active material may be in the form of secondary particles resulting from the aggradation of primary particles. The secondary particles are not limited in shape, and may have a flaky, spherical, or potato-like shape. In addition, it is preferable that the primary particles have a minor-axis size of 1 µm or less, more preferably 500 nm or less.

The shell part is made of carbon that coats the core part. The shell part is made of carbon and serves to increase the electrical conductivity of the positive electrode active material. The shell part also prevents the positive electrode composite oxide of the core part from being exposed to contact and adsorb (react with) moisture in the atmosphere.

Methods for forming a shell part are not limited, and it can be formed on the surface of the core part by a known method. Specifically, a method in which a carbon coating precursor (water or acid solution) made of an organic polymer to serve as a carbon source is mixed with particles of the core part (dry mixing or wet mixing), and then the mixture is subjected to a thermal decomposition reaction (e.g., fired at 600° C. and then 800° C.) to form a coating film, a method in which particles of the core part and a carbon coating precursor are mixed, subjected to primary drying (e.g., 250° C. or less), and then fired, and the like can be mentioned. Incidentally, granulation may be performed by spray drying or the like.

It is preferable that the carbon coating precursor is a water- or acid-soluble compound including at least one of primary amine, secondary amine, tertiary amine, and amide group compounds of N-free heterocyclic compounds and primary amine, secondary amine, tertiary amine, and amide group compounds of N-free open-chain compounds. That is, it is preferable that the shell part has a water- or acid-soluble compound including at least one of primary amine, secondary amine, tertiary amine, and amide group compounds of N-free heterocyclic compounds and primary amine, secondary amine, tertiary amine, and amide group compounds of N-free open-chain compounds.

The carbon coating precursor includes a primary amine, secondary amine, tertiary amine, or amide group compound of an N-free heterocyclic compound or backbone compound. The carbon coating precursor includes a primary amine, secondary amine, tertiary amine, or amide group compound, and thus has an N-derived electron-donating structure. Because of the electron-donating structure, the precursor is adsorbed by Lewis basic metal atoms of the positive electrode composite oxide contained in the core part. In such an adsorbed state, a shell part is produced. Therefore, a uniform shell part (carbon coating) can be formed on the surface of the core part. Incidentally, when the heterocyclic compound contains N, the effect of the electron-donating structure of the amine or the amide group decreases.

The backbone compound is a compound having lower electron donicity than N-containing functional groups. Incidentally, the backbone compound may be not only a chain compound but also be a cyclic compound. Even when the backbone compound contains N, because its electron donicity is low, the effect of the electron-donating structure of a primary amine, secondary amine, tertiary amine, or amide group compound can be exerted. Specifically, although niacinamide represented by the below formula (4) has an N-containing heterocyclic ring, the electron donicity due to the amino group (primary amine) is strong (high), and thus the above effect can be exerted.

It is preferable that the carbon coating precursor is a water- or acid-soluble compound. Incidentally, "acid" includes acid solutions (aqueous acid solutions). When the carbon coating precursor is a water- or acid-soluble compound, the precursor is adsorbed by Lewis basic metal atoms of the positive electrode composite oxide contained in the core part. When the carbon coating precursor is a compound soluble only in an organic solvent, the migration of the carbon coating precursor to be adsorbed on the surface of the core part is inhibited, making it difficult to form a uniform coating film.

Acids in which the carbon coating precursor dissolves are not limited as long as they can be removed (or disappear) in a subsequent step.

Compounds to form a carbon coating precursor are not limited as long as they have the above characteristics.

Examples of carbon coating precursors include compounds having the structures shown below. Incidentally, a compound represented by formula (5) is a compound obtained by the reaction between a tetracarboxylic acid component and a diamine component. In formula (5), it is preferable that $R_1$ is at least one member selected from the group consisting of a tetravalent group resulting from the removal of a carboxyl group from a fluorine-group-free aromatic tetracarboxylic acid, a tetravalent group resulting from the removal of a carboxyl group from an aliphatic tetracarboxylic acid, and a tetravalent group resulting from the removal of a carboxyl group from a fluorine-group-containing aromatic tetracarboxylic acid, and $R_2$ is at least one member selected from the group consisting of a divalent group resulting from the removal of an amino group from a fluorine-group-free aromatic diamine having a solubility in water at 25° C. of 0.1 g/L or more, a divalent group resulting from the removal of an amino group from an aliphatic diamine having a molecular weight of 500 or less, and a divalent group resulting from the removal of an amino group from a fluorine-group-containing aromatic diamine.

[Chemical Formula 1]

(1)

(2)

In addition, as carbon coating precursors, the following compounds can be mentioned.

Examples of primary amines include methylamine, ethylamine, n-propylamine, 2-ethanolamine, and 2-amino-2-methyl-1-propanol.

Examples of secondary amines include dimethylamine, 2-(methylamino)ethanol, and 2-(ethylamino)ethanol.

Examples of tertiary amines include 2-dimethylaminoethanol, 2-diethylaminoethanol, and 1-dimethylamino-2-propanol.

In addition, quaternary amines that can be regarded as substitution products of ammonium salts, such as tetramethylammonium hydroxide and tetraethylammonium hydroxide, may also be used.

The carbon coating precursor may also contain an additional organic compound other than the above compounds. It is preferable that the additional organic compound is a compound that does not inhibit the electron donicity of the above electron-donating compounds. Examples thereof include sugars such as sucrose, carboxymethylcellulose (CMC), and polyethylene glycol.

In the case where the carbon coating precursor contains an additional organic compound, it is preferable that the above compound is the greatest in mass (main component), and it is more preferable that the above compound is 50 mass % or more in terms of solids content.

It is most preferable that the carbon coating precursor is composed only of the above compound.

The positive electrode active material of the present mode has a specific surface area of 6.0 $m^2/g$ or more. Incidentally, the specific surface area in the present mode is a BET specific surface area. The specific surface area of a positive electrode active material relates of the amount of contact with electrically conductive ions for causing the cell reaction (in the secondary battery 1, Li ions). That is, when the positive electrode active material has an increased specific surface area of 6.0 $m^2/g$ or more, the surface thereof can contact with a larger number of electrically conductive ions (Li ions), exerting an improving effect on the battery performance. It is preferable that the specific surface area of the positive electrode active material of the present mode is 6 $m^2/g$ or more, more preferably 9 $m^2/g$ or more, and still more preferably 15 $m^2/g$ or more.

With an increase in the specific surface area of a positive electrode active material, the area of the positive electrode active material that contacts the atmosphere increases. That is, it becomes more likely that the positive electrode active material contacts and adsorbs moisture in the atmosphere. In the positive electrode active material of the present mode, the shell part (carbon coating) is uniformly formed on the surface of the core part. Accordingly, even when the specific surface area increases, gas generation is suppressed.

When the positive electrode active material of the present mode is exposed to the atmosphere to absorb moisture to saturation, then heated in a heat-evaporating manner, and continuously maintained at 250° C. for 40 minutes without exposure to the atmosphere, the moisture content thereof is 400 ppm or less as measured by a Karl Fischer method (hereinafter, KF method). Because the moisture content measured by the KF method is 400 ppm or less, in the positive electrode active material of the present mode, gas generation or battery performance degradation caused by moisture is suppressed.

Moisture adsorbed by the positive electrode active material includes two kinds: adsorbed water that has been physically adsorbed on the surface of the positive electrode active material; and water that has been chemically bound by a reaction with the positive electrode active material.

Of these two kinds of water, adsorbed water can be volatilized (evaporated) by heating.

As compared with adsorbed water, chemically bound water is more difficult to volatilize (evaporate) depending on the kind of binding. Chemically bound water can be volatilized (evaporated) (chemical bonds can be broken) by making the conditions severer than for the volatilization of adsorbed water. Further, chemically bound water is subjected to measurement by the KF method after being maintained at 250° C. for 40 minutes.

When the moisture content measured by the KF method is 400 ppm or less, the positive electrode active material of the present mode contains a low proportion of chemically bound water. Accordingly, in the formed secondary battery 1, gas generation or battery performance degradation caused by moisture is suppressed.

Incidentally, as the secondary battery 1 is repeatedly charged and discharged, chemically bound water is gradually volatilized (evaporated) from the positive electrode active material. That is, in the case where the moisture content measured by the KF method is more than 400 ppm, when the secondary battery 1 of the present mode is repeatedly charged and discharged, gas generation or battery performance degradation caused by moisture is likely to occur.

Measurement by the KF method can be performed using a commercially available Karl Fischer tester.

In measurement by the KF method, first, a positive electrode active material is exposed to the atmosphere to adsorb moisture to saturation. As a result, in the positive electrode active material, moisture is adsorbed at all the moisture-adsorbable sites of the positive electrode active material (chemical bonds are formed).

Next, heating is performed in a heat-evaporating manner. As a result of this heating, of the moisture that has been adsorbed, the above-mentioned adsorbed water is volatilized (evaporated). The conditions for heating to volatilize adsorbed water (the heating temperature, etc.) are not limited as long as adsorbed water can be volatilized (evaporated). It is preferable that heating is performed to a temperature equal to or higher than the boiling point of water to volatilize adsorbed water. Heating to 120° C. is more preferable.

Incidentally, during heating to volatilize (evaporate) adsorbed water, it is preferable that a predetermined temperature is maintained for a predetermined period of time. The predetermined temperature herein is preferably 120° C. as mentioned above. The predetermined period of time is not limited, and can be arbitrarily selected as a period of time that allows adsorbed water to be volatilized (evaporated). For example, it may be 30 minutes.

Heating to volatilize (evaporate) adsorbed water is preferably performed at ambient pressure, but may also be performed at reduced pressure. When heating is performed at reduced pressure, the heating temperature can be lowered.

Subsequently, the positive electrode active material is continuously maintained at 250° C. for 40 minutes without exposure to the atmosphere, and the moisture content at that time is measured by the KF method. When measurement by the KF method is successively performed after the volatilization of adsorbed water without exposure to the atmosphere, the re-adsorption of adsorbed water that has been volatilized is suppressed.

In the positive electrode active material of the present mode, it is preferable that when the whole mass is taken as 100 mass %, the mass of the shell part is 0.5 to 5.0 mass %. When the mass is within this range, the positive electrode active material having a core-shell structure can reliably exert the reducing effect on the moisture content (chemically bound water) mentioned above. Incidentally, when the mass of the shell part is less than 0.5 mass %, the shell part (carbon coating) is less likely to be sufficiently formed, while when it is more than 5 mass %, the proportion of the shell part becomes excessive, whereby the carbon coating becomes excessively thick. The mass is more preferably 1 to 4 mass %, and still more preferably 1 to 3 mass %.

The mass proportion of the shell part can be measured using a carbon-sulfur analyzer (e.g., trade name: EMIA-920V2, manufactured by HORIBA, Ltd.).

In the positive electrode active material of the present mode, the specific surface area of the positive electrode composite oxide forming the core part is not limited, but is preferably 3 to 15 $m^2/g$. When the specific surface area of the positive electrode composite oxide is within this range, the resulting positive electrode active material has a specific surface area of 6.0 $m^2/g$ or more, in which the shell part is 0.5 to 5.0 mass %. The specific surface area of the positive electrode composite oxide of the present mode is more preferably 3 to 10 $m^2/g$, and more preferable 3 to 6 $m^2/g$.

(Configuration Other than Positive Electrode Active Material)

The electrically conductive material ensures the electrical conductivity of the positive electrode 2. Examples of usable electrically conductive materials include, but are not limited to, fine particles of graphite and fine particles of amorphous carbon such as carbon black (e.g., acetylene black, ketjen black, carbon nanofibers, etc.) and needle coke.

The binding material in the positive electrode mixture binds the positive electrode active material particles and the electrically conductive material. Examples of usable binding materials include, but are not limited to, polyvinylidene fluoride (PVDF), EPDM, SBR, NBR, and fluororubber.

As the solvent for the positive electrode mixture, generally, an organic solvent that dissolves a binding material is used. Examples thereof include, but are not limited to, N-methyl-2-pyrrolidone (NMP), dimethylformamide, dimethylacetamide, methyl ethyl ketone, cyclohexanone, methyl acetate, methyl acrylate, diethyl triamine, N—N-dimethylaminopropylamine, ethylene oxide, and tetrahydrofuran. In addition, it is also possible to add a dispersant, a thickener, or the like to water and form the positive electrode active material into a slurry with polytetrafluoroethylene (PTFE) or the like.

As the positive current collector 20, it is possible to use a processed product of aluminum, stainless steel, or a like metal, such as a plate-shaped foil, screen, punched metal, or formed metal, without being limited thereto.

[Negative Electrode]

The negative electrode 3 contains a negative electrode active material. The negative electrode 3 has a negative electrode active material layer 31 on the surface of a negative electrode collector 30. The negative electrode active material layer 31 is formed by applying a negative electrode mixture obtained by mixing the negative electrode active material and a binding material to the surface of the negative electrode collector 30, followed by drying. The negative electrode mixture is in the form of a paste (slurry) with a suitable solvent.

As the negative electrode active material in the negative electrode 3, a conventional negative electrode active material may be used. Examples thereof include negative electrode active materials containing at least one element selected from Sn, Si, Sb, Ge, and C. Of these negative electrode active materials, it is preferable that C is a carbon material capable of storing/releasing electrolytic ions of the lithium ion secondary battery (having Li-storage capacity), more preferably graphite.

In addition, of these negative electrode active materials, Sn, Sb, and Ge are alloy materials particularly prone to volume changes. These negative electrode active materials may form alloys with other metals, such as Ti—Si, Ag—Sn, Sn—Sb, Ag—Ge, Cu—Sn, and Ni—Sn.

As the electrically conductive material in the negative electrode 3, a carbon material, a metal powder, an electrically conductive polymer, or the like may be used. In terms of electrical conductivity and stability, it is preferable to use carbon materials, such as acetylene black, ketjen black, and carbon black.

Examples of binding materials for the negative electrode 3 include PTFE, PVDF, fluororesin copolymer (tetrafluoroethylene-hexafluoropropylene copolymer), SBR, acrylic rubber, fluororubber, polyvinyl alcohol (PVA), styrene-maleic acid resin, polyacrylate, and carboxymethylcellulose (CMC).

Examples of solvents for the mixture of the negative electrode 3 include organic solvents such as NMP and water.

As the negative electrode collector 30, a conventional current collector may be used. It is possible to use a processed product of copper, stainless steel, titanium, nickel, or a like metal, such as a plate-shaped foil, screen, punched metal, or formed metal, without being limited thereto.

[Nonaqueous Electrolyte]

The nonaqueous electrolyte 4 is not particularly limited in its material composition, and those having known material compositions may be used. It is preferable that the nonaqueous electrolyte 4 (also referred to as nonaqueous electrolytic solution) of the present mode is composed of a supporting salt dissolved in an organic solvent as with known nonaqueous electrolytes.

The kind of the supporting salt of the nonaqueous electrolyte is not particularly limited. For example, it is preferable that the supporting salt is at least member selected from inorganic salts such as $LiPF_6$, $LiBF_4$, $LiClO_4$, and $LiAsF_6$, derivatives of these inorganic salts, organic salts such as $LiSO_3CF_3$, $LiC(SO_3CF_3)_3$, $LiN(SO_2CF_3)_2$, $LiN(SO_2C_2F_5)_2$, and $LiN(SO_2CF_3)(SO_2C_4F_9)$, and derivatives of these organic salts. These supporting salts can further improve the battery performance. In addition, even in a temperature region other than room temperature, the battery performance can be kept even higher. The concentration of the supporting salt is not particularly limited either. It is preferable that the concentration is suitably selected considering the kinds of supporting salt and organic solvent.

The organic solvent (nonaqueous solvent) in which the supporting salt dissolves is not particularly limited as long as it is an organic solvent generally used for a nonaqueous electrolyte. For example, carbonates, halogenated hydrocarbons, ethers, ketones, nitriles, lactones, and oxolane compounds may be used. In particular, propylene carbonate, ethylene carbonate, 1,2-dimethoxyethane, dimethyl carbonate, diethyl carbonate, ethyl methyl carbonate, vinylene carbonate, and the like, as well as mixed solvents thereof, are preferable. Of these organic solvents, it is particularly preferable to use at least one nonaqueous solvent selected from the group consisting of carbonates and ethers. This is because they are excellent in terms of supporting salt solubility, dielectric constant, and viscosity, and provide the lithium ion secondary battery 1 with high charge-discharge efficiency.

In the secondary battery 1 of the present mode, the most preferable nonaqueous electrolyte is composed of a supporting salt dissolved in an organic solvent.

[Other Configuration]

In the secondary battery 1 of the present mode, the positive electrode 2 and the negative electrode 3 are arranged in such a manner that the positive electrode active material layer 21 and the negative electrode active material layer 31 face each other with a separator 5 therebetween and housed in a battery case 6 together with the nonaqueous electrolyte 4.

(Separator)

The separator 5 serves to electrically insulate the positive electrode 2 and the negative electrode 3 from each other and holds the nonaqueous electrolyte 4. As the separator 5, it is preferable to use a porous synthetic resin membrane, particularly a porous membrane of a polyolefin polymer (polyethylene, polypropylene), for example.

(Battery Case)

In the battery case 6, the positive electrode 2, the negative electrode 3, and the separator 5 therebetween are housed (enclosed) together with the nonaqueous electrolyte 4.

The battery case 6 is made of a material that inhibits the permeation of moisture between the inside and outside. Examples of such materials include materials having a metal layer.

[Effects]

As described above, in the secondary battery 1 of the present mode, the positive electrode active material having a core-shell structure has a large specific surface area and a low content of moisture (in particular, water chemically bound to the core part). This is effective in suppressing gas generation or battery performance degradation caused by moisture when the battery is repeatedly charged and discharged.

In the present mode, as a carbon coating precursor, an amino functional group having high electron donicity is included. As a result, a shell part is uniformly formed on the surface of the core part, whereby the above effect can be further exerted.

In the present mode, the proportion of the shell part is limited. As a result, the positive electrode active material having a core-shell structure can be provided with a uniform shell part, whereby the above effect can be further exerted.

According to the present mode, by applying the present disclosure to a positive electrode active material, the above effect can be exerted.

Second Embodiment

The present mode is a mode in which the electrode active material of the disclosure is used as a negative electrode active material.

Unless otherwise noted, the secondary battery of the present mode is a lithium ion secondary battery 1 having the same configuration as in the first embodiment.

[Positive Electrode]

The configuration of a positive electrode 2 is the same as in the first embodiment, except that the positive electrode active material does not have a core-shell structure.

[Negative Electrode]

(Negative Electrode Active Material)

A negative electrode 3 contains a negative electrode active material. The negative electrode 3 has a negative electrode active material layer 31 on the surface of a negative electrode collector 30. The negative electrode active material layer 31 is formed by applying a negative electrode mixture obtained by mixing the negative electrode active material and a binding material to the surface of the negative electrode collector 30, followed by drying. The negative electrode mixture is in the form of a paste (slurry) with a suitable solvent.

The negative electrode active material includes: a core part including at least either an inorganic oxide or a carbon-composite inorganic composite oxide; and a shell part formed of a carbon coating on the core part. Because the core part having low electrical conductivity is coated with the shell part made of carbon having high electrical conductivity (carbon coating), this negative electrode active material has improved electrical conductivity (electron conductivity). In addition, at the portion where the core part is coated with the shell part, the shell part is not exposed. Accordingly, the adsorption of moisture by the core part at the coated portion can be prevented.

The core part includes at least either an inorganic oxide or a carbon-composite inorganic composite oxide (hereinafter referred to as negative electrode composite oxide). This negative electrode composite oxide functions as a negative electrode active material for a secondary battery.

The specific composition of the negative electrode composite oxide (inorganic oxide, carbon-composite inorganic composite oxide) is not limited as long as it is a composite oxide. It may be a composite oxide conventionally used as a negative electrode active material for a lithium ion secondary battery (nonaqueous electrolyte secondary battery).

Examples of negative electrode composite oxides (inorganic oxides) include lithium titanate, tungsten oxide ($WO_3$), amorphous tin oxide (e.g., $SnB_{0.4}P_{0.6}O_{3.1}$), tin silicon oxide ($SnSiO_3$), silicon oxide ($SiO_x$), and like compounds. Incidentally, as long as an oxide is present on the surface thereof, the negative electrode composite oxide may also be configured such that an oxide is present on the surface of particles of an element that is a pure metal but functions as a negative electrode active material (causes an electrode reaction), such as Sn or Si. Specifically, it may be configured such that an oxide adheres to the surface of a pure metal, or may also be configured such that the surface of a pure metal is partially oxidized.

The negative electrode composite oxide may include two or more different compounds selected therefrom. It is most preferable that the negative electrode composite oxide (inorganic oxide) is composed only of lithium titanate.

The lithium titanate may be a known oxide. For example, it is possible to use the lithium titanate described in the specification of JP-2014-192154 A (corresponding to US 2014/0295289 A).

The negative electrode 3 may contain only the above negative electrode composite oxide as a negative electrode active material, or may also contain a mixture with an additional negative electrode active material. The additional negative electrode active material is a substance conventionally used as a negative electrode active material for a lithium ion secondary battery. Examples of negative electrode active materials conventionally used for a lithium ion secondary battery include negative electrode active materials containing at least one element selected from pure metals, such as Sn and Si, Sn, Si, Sb, Ge, and C. Of these negative electrode active materials, it is preferable that C is a carbon material capable of storing/releasing electrolytic ions of the lithium ion secondary battery (having Li-storage capacity), more preferably amorphous-coated natural graphite.

In addition, of these negative electrode active materials, Sn, Sb, and Ge are alloy materials particularly prone to volume changes. These negative electrode active materials may form alloys with other metals, such as Ti—Si, Ag—Sn, Sn—Sb, Ag—Ge, Cu—Sn, and Ni—Sn.

In the case where the negative electrode 3 contains a mixture of the above negative electrode composite oxide and the additional negative electrode active material, the mixing ratio is not limited. It is preferable that the negative electrode composite oxide is rich. That is, it is preferable that when the total mass of the negative electrode active materials is taken as 100%, the mass of the above negative electrode composite oxide is 50% or more.

In the negative electrode active material, production methods for the above negative electrode composite oxide and the additional negative electrode active material are not limited, and they can be produced using known production methods. The negative electrode composite oxide and the additional negative electrode active material may be in the form of secondary particles resulting from the aggradation of primary particles. The primary particles are not limited in shape, and may have a flaky, spherical, or potato-like shape. In addition, it is preferable that the primary particles have a minor-axis size of 1 μm or less, more preferably 500 nm or less.

The shell part is made of carbon that coats the core part (carbon coating). The configuration of the shell part of the negative electrode active material of the present mode may be the same as that of the shell part of the positive electrode active material of the first embodiment, and the same functions/effects are exerted.

The negative electrode active material of the present mode has a specific surface area of 6.0 $m^2/g$ or more as with the positive electrode active material of the first embodiment. According to this configuration, an improving effect on battery performance is exerted as with the positive electrode active material of the first embodiment. It is preferable that the specific surface area of the negative electrode active material of the present mode is 6 $m^2/g$ or more, more preferably 10 $m^2/g$ or more, and still more preferably 15 $m^2/g$ or more.

With an increase in the specific surface area of a negative electrode active material, the area of the negative electrode active material that contacts the atmosphere increases. That is, it becomes more likely that the negative electrode active material contacts and adsorbs moisture in the atmosphere. In the negative electrode active material of the present mode, the shell part (carbon coating) is uniformly formed on the surface of the core part. Accordingly, even when the specific surface area increases, gas generation is suppressed.

As with the positive electrode active material of the first embodiment, when the negative electrode active material of the present mode is exposed to the atmosphere to absorb moisture to saturation, then heated in a heat-evaporating manner, and continuously maintained at 250° C. for 40 minutes without exposure to the atmosphere, the moisture content thereof is 400 ppm or less as measured by a Karl Fischer method (hereinafter, KF method). Because the moisture content measured by the KF method is 400 ppm or less, in the negative electrode active material of the present mode, gas generation or battery performance degradation caused by moisture is suppressed.

The configuration and effects of the KF method are the same as with the positive electrode active material of the first embodiment.

In the negative electrode active material of the present mode, it is preferable that when the whole mass is taken as 100 mass %, the mass of the shell part is 0.5 to 5.0 mass %. When the mass is within this range, the negative electrode active material having a core-shell structure can reliably exert the reducing effect on the moisture content (chemically bound water) mentioned above. Incidentally, when the mass of the shell part is less than 0.5 mass %, the shell part (carbon coating) is less likely to be sufficiently formed, while when it is more than 5 mass %, the proportion of the shell part becomes excessive, whereby the carbon coating becomes excessively thick. The mass is more preferably 0.5 to 3 mass %, and still more preferably 0.5 to 2 mass %.

In the negative electrode active material of the present mode, the specific surface area of the negative electrode composite oxide forming the core part is not limited, but is preferably 3 to 25 $m^2/g$. When the specific surface area of the negative electrode composite oxide is within this range, the resulting negative electrode active material has a specific surface area of 6.0 $m^2/g$ or more, in which the shell part is 0.5 to 5.0 mass %. The specific surface area of the negative electrode composite oxide of the present mode is more preferably 3 to 15 $m^2/g$, and more preferably 3 to 10 $m^2/g$.

(Configuration Other than Negative Electrode Active Material)

The configuration of the negative electrode 3 other than the negative electrode active material is the same as in the first embodiment.

[Effects]

The negative electrode active material of the present mode has the same configuration as the positive electrode active material of the first embodiment. That is, in the lithium ion secondary battery 1 of the present mode, the negative electrode active material in the negative electrode 3 has a low content of moisture. As with the positive electrode active material of the first embodiment, this is effective in suppressing gas generation or battery performance degradation caused by moisture when the battery is repeatedly charged and discharged.

Other effects that can be exerted by the present mode are the same as in the first embodiment.

Third Embodiment

The present mode is a mode in which the electrode active material of the disclosure is used as a positive electrode active material and also as a negative electrode active material.

Unless otherwise noted, a secondary battery 1 of the present mode is the lithium ion secondary battery 1 having the same configuration as in the first embodiment.

[Positive Electrode]

A positive electrode 2 has the same configuration as the positive electrode 2 of the first embodiment.

[Negative Electrode]

A negative electrode 3 has the same configuration as the negative electrode 3 of the second embodiment.

[Effects]

The secondary battery 1 of the present mode uses the positive electrode 2 of the first embodiment and the negative electrode 3 of the second embodiment. That is, the effects of the respective modes mentioned above can be exerted at the same time.

According to this configuration, when the battery is repeatedly charged and discharged, the elution of moisture from the electrode 2 or 3 into the secondary battery 1 is suppressed. This is even more effective in suppressing gas generation or battery performance degradation caused by moisture.

Fourth Embodiment

Figure 2:
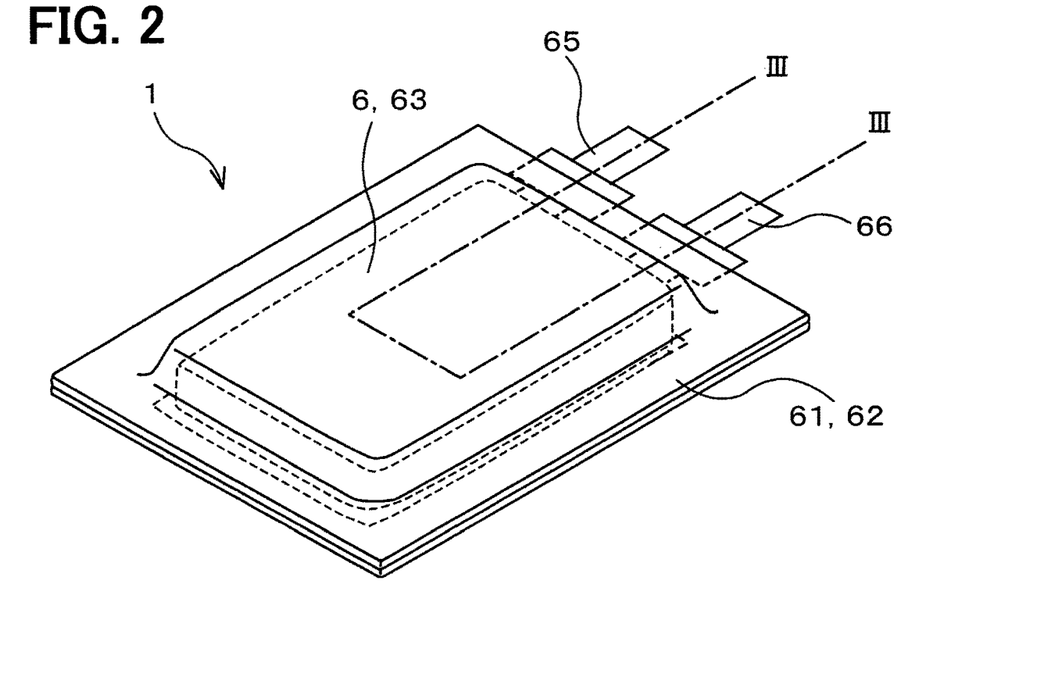
FIG. 2 is a perspective view showing the configuration of the lithium ion secondary battery 1 of a forth embodiment.
Figure 3:
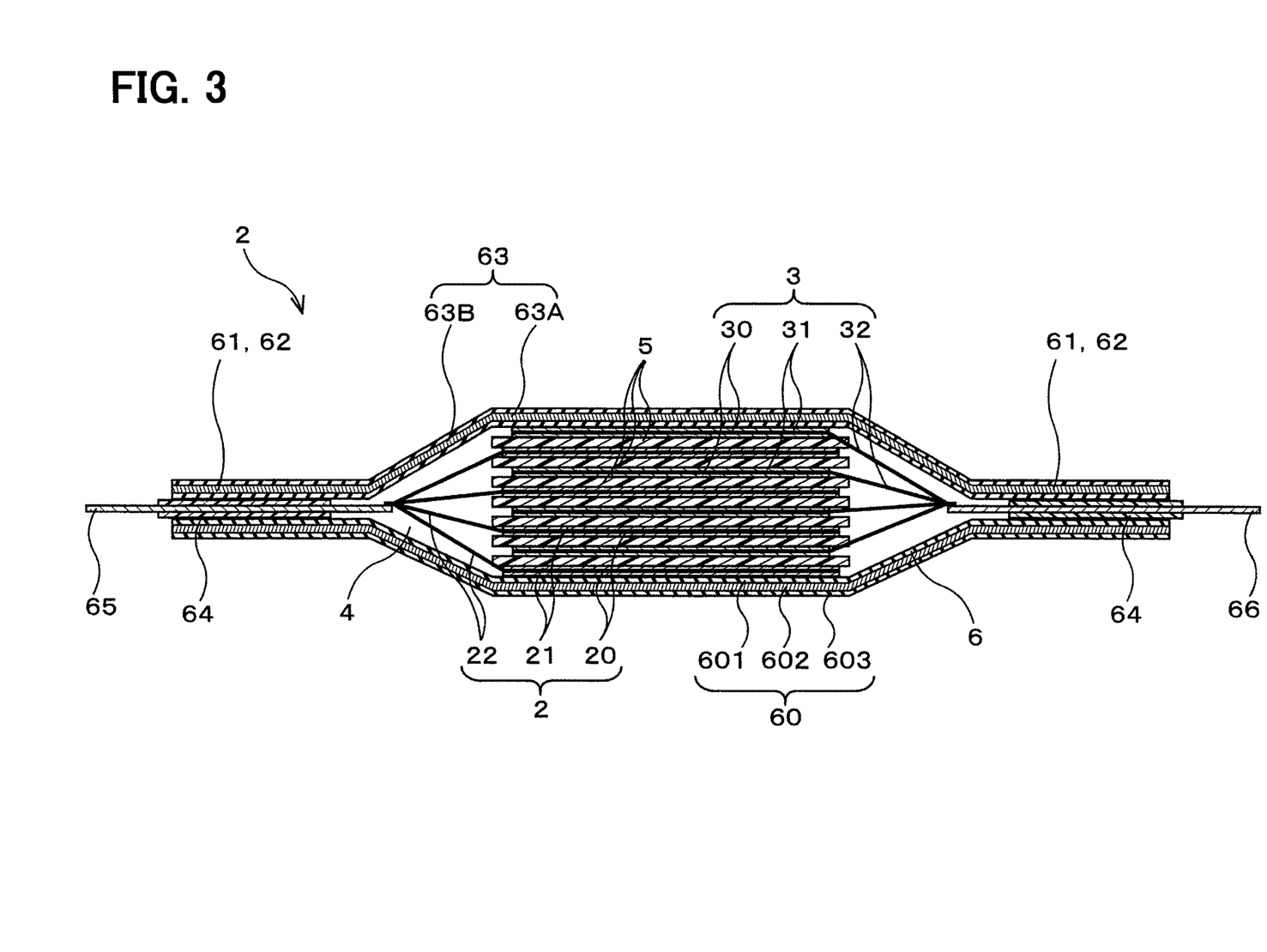
FIG. 3 is a cross-sectional view showing the configuration of the lithium ion secondary battery 1 of the forth embodiment.

The present mode is a mode in which the secondary battery 1 of the first embodiment is applied to a laminated battery, including a positive electrode 2, a negative electrode 3, a nonaqueous electrolyte 4, and the like with the same configurations as in the first embodiment. The configuration of the secondary battery 1 of the present mode is shown in FIG. 2 and FIG. 3. In FIG. 2, the configuration is shown as a perspective view of the secondary battery 1. In FIG. 3, the configuration is shown as a cross-sectional view along the cross-section in FIG. 2.

In a lithium ion secondary battery 1 of the present mode, the positive electrode 2 and the negative electrode 3 are housed (enclosed) in a battery case 6 formed of a laminate case. Incidentally, unless specifically limited, the configuration in the present mode is the same as in the first embodiment.

The positive electrode 2 has a positive electrode active material layer 21 formed on each surface (both sides) of an approximately rectangular positive current collector 20. The positive electrode 2 has an uncoated portion 22 at which the positive current collector 20 is exposed (having no positive electrode active material layer 21 formed) on one side of the rectangular shape.

The negative electrode 3 has a negative electrode active material layer 31 formed on each surface (both sides) of an approximately rectangular negative current collector 30. The negative electrode 3 has an uncoated portion 32 at which the negative current collector 30 is exposed (having no negative electrode active material layer 31 formed) on one side of the rectangular shape.

The negative electrode active material layer 31 of the negative electrode 3 is formed wider than the positive electrode active material layer 21 of the positive electrode 2. The size is such that when the negative electrode active material layer 31 of the negative electrode 3 is superposed on the positive electrode active material layer 21, the positive electrode active material layer 21 can be completely covered without exposure.

The positive electrode 2 and the negative electrode 3 are laminated with a separator 5 therebetween and housed (enclosed) in the battery case 6 formed from a laminate film together with the nonaqueous electrolyte 4.

The separator 5 is formed to have a wider area than the negative electrode active material layer 31.

The positive electrode 2 and the negative electrode 3 are laminated with the separator 5 therebetween in such a manner that the center of the positive electrode active material layer 21 and that of the negative electrode active material layer 31 overlap each other. At this time, the uncoated portion 22 of the positive electrode 2 and the uncoated portion 32 of the negative electrode 3 are arranged in opposite directions (facing away from each other).

(Battery Case)

The battery case 6 is formed from a laminate film 60. The laminate film includes a plastic resin layer 601/a metal foil 602/and a plastic resin layer 603 in this order. In the battery case 6, the laminate film 60 that has been previously curved into a predetermined shape is, with the plastic resin layers 601 and 603 being softened by heat or a certain solvent, pressed against and thus bonded to another laminate film or the like.

The battery case 6 is formed as follows: the laminate films 60 previously formed into a shape that can receive the positive electrode 2 and the negative electrode 3 (embossed) are superposed on each other, then the peripheral edges are bonded over the entire perimeter, and the positive electrode 2 and the negative electrode 3 are enclosed therein. By the peripheral bonding, a sealing portion is formed. The peripheral bonding in the present mode was performed by welding.

The battery case 6 is formed by superposing the laminate film 60 and another laminate film 60 on each other. Another laminate film 60 herein means a laminate film to be bonded (welded). That is, the battery case 6 includes not only a mode of being formed from two or more laminate films 60 but also a mode of being formed by folding one laminate film.

The peripheral bonding (assembly) of the battery case 6 is performed in a reduced-pressure atmosphere (preferably in vacuum). As a result, only the electrode assembly is enclosed in the battery case 6 without incorporating the atmosphere (moisture contained therein).

As shown in FIG. 2 and FIG. 3, the previously formed laminate film 60 has a flat portion 61, which forms a sealing portion 62 with another laminate film 60 when superposed, and a tank-shaped portion 63, which is formed in the central region of the flat portion 61 and can receive the positive electrode 2 and the negative electrode 3.

As shown in FIG. 2 and FIG. 3, the laminate films 60,60 are each curved (formed) to have a concave shape that can receive the positive electrode 2 and the negative electrode 3. The laminate films 60,60 have the same shape. When they are superposed on each other in a facing manner, the flat portions 61, 61 completely overlap each other.

In each laminate film 60, the flat portion 61 is parallel to a bottom portion 63A of the tank-shaped portion 63 (a portion that forms the end of the lithium ion secondary battery 1 in the laminating direction). The flat portion 61 and the bottom portion 63A of the tank-shaped portion 63 are connected by a raised portion 63B. The raised portion 63B extends in a direction that crosses the parallel direction of the flat portion 61 and the bottom portion 63A (inclined direction). The bottom portion 63A is formed smaller than the opening of the tank-shaped portion 63 (the inner end of flat portion 61).

In the battery case 6, the sealing portion 62 is formed on the perimeter of the flat portions 61,61. On the inner side of the sealing portion 62 (in the direction toward to the electrode assembly), an unbonded portion, at which the flat portions 61,61 overlap each other, is formed. At the unbonded portion where the flat portions 61,61 overlap each other, the flat portions may be in contact with or spaced from each other. Further, the uncoated portions 22 and 32 of the electrode plates 2 and 3 or the separator 5 may also be interposed.

The laminate films 60,60 are previously formed in the shape shown in FIG. 2 and FIG. 3. Formation into this shape is performed using a known method.

In the lithium ion secondary battery 1, the positive electrode 2 and the negative electrode 3 are connected to the respective electrode terminals (positive electrode terminal 65, negative electrode terminal 66).

(Electrode Terminal)

The positive electrode terminal 65 is electrically connected to the uncoated portion 22 of the positive electrode 2. The negative electrode terminal 66 is electrically connected to the uncoated portion 32 of the negative electrode 3. In the present mode, the uncoated portions 22 and 32 of the electrodes 2 and 3 are joined to the electrode terminals 65 and 66, respectively, by welding (vibration welding). The central regions of the uncoated portions 22 and 32 of the electrodes 2 and 3 in the width direction are joined to the electrode terminals 65 and 66, respectively.

At the portion where the electrode terminals 65 and 66 each penetrate the battery case 6, the plastic resin layer 601 of the laminate films 60,60 and each of the electrode terminals 65 and 66 are joined via a sealant 64 and thus kept in a hermetically sealed state.

The electrode terminals 65 and 66 are each made of a sheet-shaped (foil-shaped) metal, and the sealant 64 is made of a resin that covers the sheet-shaped electrode terminals 65 and 66. The sealant 64 covers the portion at which each of the electrode terminals 65 and 66 overlaps the flat portion 61. Because the electrode terminals 65 and 66 are sheet-shaped, the deformation stress on the laminate film 60 due to the presence of the electrode terminals 65 and 66 at the portion where the battery case 6 is penetrated can be reduced. In addition, the welding of the uncoated portions 22 and 32 of the electrodes 2 and 3 (vibration welding) can be easily performed.

[Effects]

The secondary battery 1 of the present mode has the same configuration as in the first embodiment except for the difference in shape, and has the same effect as in the first embodiment.

That is, although the secondary battery 1 of the present mode has been applied to a laminated battery, the disclosure is not limited to this mode. For example, in addition to the laminated amorphous secondary battery 1 of the present mode, batteries of various shapes, such as coin-shaped, cylindrical, and prismatic batteries, are possible.

In addition, although the present mode is a mode in which the first embodiment is applied to the laminated amorphous secondary battery 1, this mode may also be applied to the second or third embodiment to exert the same effect.

Further, secondary batteries 1 may also be combined in series and/or in parallel to form an assembled battery.

EXAMPLES

Hereinafter, the disclosure will be described in detail using examples.

As examples for the detailed description of the disclosure, positive electrode active materials (Examples 1 to 4, Comparative Examples 1 to 6) and negative electrode active materials (Examples 5 and 6, Comparative Example 7) configured as shown in Table 1 were produced by the following production methods. Then, lithium ion secondary batteries using these electrode active materials were produced. Incidentally, the production of each example was performed in a dry atmosphere in a dry box.

TABLE 1

| | Core Part Kind of Oxide | Shell Part Carbon Precursor | Shell Part Carbon Content (mass %) | Specific Surface Area ($m^2/g$) | Moisture Content (ppm) |
|---|---|---|---|---|---|
| Example 1 | LFP | Polyamic acid | 2.4 | 6.2 | 137 |
| Comparative Example 1 | LFP | — | — | 5.6 | 1246 |
| Comparative Example 2 | LFP | Sucrose | 2.1 | 8.1 | 615 |
| Example 2 | LMFP | Polyamic acid | 2.5 | 16.7 | 218 |
| Example 3 | LMFP | Polylysine/Sucrose | 3.4 | 19.3 | 192 |
| Example 4 | LMFP | Amino-ethylated acrylic polymer | 1.8 | 9.4 | 333 |
| Comparative Example 3 | LMFP | — | — | 18.1 | 1792 |
| Comparative Example 4 | LMFP | Sucrose | 3.1 | 24.8 | 850 |
| Comparative Example 5 | LMFP | PVP/Sucrose | 2.7 | 21.1 | 921 |
| Comparative Example 6 | NMC | — | — | 1.2 | 418 |
| Example 5 | LTO | Sucrose | 0.9 | 21 | 978 |
| Example 6 | LTO | Polylysine/Sucrose | 1.4 | 19.3 | 387 |
| Comparative Example 7 | LTO | — | — | 17.3 | 1723 |

[Production of Core Part of Positive Electrode Active Material]

Compounds of Li source ($Li_2SO_4$), P source ($(NH_4)_2HPO_4$), Co source ($CoSO_4 \cdot 7H_2O$), Mn source ($MnSO_4 \cdot 5H_2O$), and Fe source ($FeSO_4 \cdot 7H_2O$) are each prepared (weighed) in predetermined atomic ratios. The predetermined atomic ratios are atomic ratios to give $LiFePO_4$ (in Table 1, shown as LFP), $LiMn_{0.8}Fe_{0.2}PO_4$ (in Table 1, shown as LFMP), and $LiNi_{1/3}Co_{1/3}Mn_{1/3}O_2$ (in Table 1, shown as NMC).

The raw material compounds prepared were each wet-mixed, followed by hydrothermal synthesis at 200° C. for 1 hour. Each mixture was then subjected to dehydration to give a core part of a positive electrode active material.

[Production of Core Part of Negative Electrode Active Material]

$TiO_2$ and $LiHCOO-H_2O$ are each prepared (weighed) in a predetermined atomic ratio (1:1).

The raw material compounds prepared were each wet-mixed and then mixed with lithium carbonate ($Li_2CO_3$), followed by firing at 900° C. for 3 hours. Subsequently, the fired body was crushed in a ball mill to give a core part of a negative electrode active material.

[Production of Core-Shell Structure]

A compound to serve as a carbon coating precursor is prepared as shown in Table 1. The carbon coating precursor was dissolved in water or an acid and then mixed with each composite oxide to serve as a core part, followed by heating at 600° C. for 1 hour, and then heating and firing at 800° C. for 0.5 hours.

As a result, an electrode active material having a core-shell structure (positive electrode active material, negative electrode active material) was produced.

[Measurement of Amount of Adsorbed Water]

First, an electrode active material is exposed to the atmosphere to adsorb moisture in the atmosphere to saturation. Next, the electrode active material is heated in a heat-evaporating manner at 120° C. for 30 minutes, and then, without exposure to the atmosphere, continuously maintained at 250° C. for 40 minutes. The moisture content at this time (40 minutes) is measured by the KF method. The measured moisture content was taken as the amount of water adsorbed by the electrode active material.

The measurement of moisture content by the KF method was performed using a Karl Fischer moisture meter (trade name: MKC610, manufactured by Kyoto Electronics Manufacturing Co., Ltd.).

Example 1

The positive electrode active material of this example has a core part made of $LiFePO_4$ (LFP) having an olivine structure and a shell part formed of a carbon coating on the surface thereof. The shell part was formed using the polyamic acid represented by formula (1) as a carbon coating precursor.

In the positive electrode active material of this example, the specific surface area was 6.2 $m^2/g$, the amount of adsorbed water was 137 ppm, and the mass proportion of the shell part was 2.4 mass %.

Comparative Example 1

The positive electrode active material of this example is composed only of LFP. This example does not have a core-shell structure.

In the positive electrode active material of this example, the specific surface area was 5.6 $m^2/g$, and the amount of adsorbed water was 1246 ppm.

Comparative Example 2

The positive electrode active material of this example has a core part made of LFP and a shell part formed of a carbon coating on the surface thereof. The shell part was formed using sucrose, which is a sugar, as a carbon coating precursor. Sucrose has an N-free composition as shown in formula (6). That is, it is neither an amide group compound nor an amine compound.

In the positive electrode active material of this example, the specific surface area was 8.1 $m^2/g$, the amount of adsorbed water was 615 ppm, and the mass proportion of the shell part was 2.1 mass %.

[Chemical Formula 2]

(6)

Example 2

The positive electrode active material of this example has a core part made of $LiMn_{0.8}Fe_{0.2}PO_4$ (LMFP) having an olivine structure and a shell part formed of a carbon coating on the surface thereof. The shell part was formed using the polyamic acid represented by formula (1) as a carbon coating precursor.

In the positive electrode active material of this example, the specific surface area was 16.7 $m^2/g$, the amount of adsorbed water was 218 ppm, and the mass proportion of the shell part was 2.5 mass %.

Example 3

The positive electrode active material of this example has a core part made of LMFP and a shell part formed of a carbon coating on the surface thereof. For the shell part, a mixture of the polylysine represented by formula (2) and sucrose in a mass ratio of 6:4 was used as a carbon coating precursor. Sucrose in the carbon coating precursor functions not only as a carbon source for the shell part but also as a viscosity modifier.

In the positive electrode active material of this example, the specific surface area was 19.3 $m^2/g$, the amount of adsorbed water was 192 ppm, and the mass proportion of the shell part was 3.4 mass %.

Example 4

The positive electrode active material of this example has a core part made of LMFP and a shell part formed of a carbon coating on the surface thereof. The shell part was formed using the aminoethylated acrylic polymer represented by formula (3) as a carbon coating precursor.

In the positive electrode active material of this example, the specific surface area was 9.4 $m^2/g$, the amount of adsorbed water was 333 ppm, and the mass proportion of the shell part was 1.8 mass %.

Comparative Example 3

The positive electrode active material of this example is composed only of LMFP. This example does not have a core-shell structure.

In the positive electrode active material of this example, the specific surface area was 18.1 $m^2/g$, and the amount of adsorbed water was 1792 ppm.

Comparative Example 4

The positive electrode active material of this example has a core part made of LMFP and a shell part formed of a carbon coating on the surface thereof. The shell part was formed using sucrose, which is a sugar, as a carbon coating precursor. Sucrose is the same as in Comparative Example 2.

In the positive electrode active material of this example, the specific surface area was 24.8 m²/g, the amount of adsorbed water was 850 ppm, and the mass proportion of the shell part was 3.1 mass %.

Comparative Example 5

The positive electrode active material of this example has a core part made of LMFP and a shell part formed of a carbon coating on the surface thereof. For the shell part, a mixture of polyvinylpyrrolidone (PVP) represented by formula (7) and sucrose in a mass ratio of 6:4 was used as a carbon coating precursor.

In the positive electrode active material of this example, the specific surface area was 21.1 m²/g, the amount of adsorbed water was 921 ppm, and the mass proportion of the shell part was 2.7 mass %.

[Chemical Formula 3]

(7)

Comparative Example 6

The positive electrode active material of this example is composed only of $LiNi_{1/3}Co_{1/3}Mn_{1/3}O_2$ (NMC). This example does not have a core-shell structure.

In the positive electrode active material of this example, the specific surface area was 1.2 m²/g, and the amount of adsorbed water was 418 ppm.

Example 5

The negative electrode active material of this example has a core part made of lithium titanate (LTO) and a shell part formed of a carbon coating on the surface thereof. The shell part was formed using the polyamic acid represented by formula (1) as a carbon coating precursor.

In the negative electrode active material of this example, the specific surface area was 21.0 m²/g, the amount of adsorbed water was 978 ppm, and the mass proportion of the shell part was 0.9 mass %.

Example 6

The negative electrode active material of this example has a core part made of LMFP and a shell part formed of a carbon coating on the surface thereof. For the shell part, a mixture of the polylysine represented by formula (2) and sucrose in a mass ratio of 6:4 was used as a carbon coating precursor.

In the negative electrode active material of this example, the specific surface area was 19.3 m²/g, the amount of adsorbed water was 387 ppm, and the mass proportion of the shell part was 1.4 mass %.

Comparative Example 7

The negative electrode active material of this example is composed only of LTO. This example does not have a core-shell structure.

In the negative electrode active material of this example, the specific surface area was 17.3 m²/g, and the amount of adsorbed water was 1723 ppm.

[Secondary Battery]

Using the electrode active material of each of the above examples, the laminated secondary battery 1 according to the forth embodiment was produced.

The secondary battery 1 is assembled by laminating the positive electrode 2 and the negative electrode 3 with the separator 5 therebetween, and enclosing the laminate in the battery case 6 together with the nonaqueous electrolyte 4.

The positive electrode 2 used was obtained as follows. A positive electrode mixture obtained by mixing 85 parts by mass of a positive electrode active material, 10 parts by mass of acetylene black (AB), and 5 parts by mass of PVDF in a solvent was applied to the positive current collector 20 formed of an aluminum foil, followed by drying, thereby forming the positive electrode active material layer 21.

The negative electrode 3 used was obtained as follows. A negative electrode mixture was prepared by mixing 98 parts by mass of a negative electrode active material, 1 part by mass of styrene butadiene rubber (SBR), and 1 part by mass of carboxymethylcellulose (CMC) in a solvent. The negative electrode mixture was applied to both sides of the negative electrode collector 30 formed of a 0.01-mm-thick copper foil, followed by drying, thereby forming the negative electrode active material layer 31.

The positive electrode 2 and the negative electrode 3 herein are formed such that the value of (negative electrode capacity)/(positive electrode capacity) is 1.3.

For the secondary batteries 1 of Examples 1 to 4 and Comparative Examples 1 to 6, graphite was used as the negative electrode active material. For the secondary batteries 1 of Examples 5 and 6 and Comparative Example 7, NMC of Comparative Example 6 was used as the positive electrode active material.

As the separator 5, a 0.016-mm-thick porous membrane made of polyethylene was used.

The nonaqueous electrolyte 4 used was obtained as follows. In a mixed solvent of EC:DC mixed in a ratio of 30:70 (vol %), $LiPF_6$ was dissolved to a concentration of 1 mol %. As an additive, 2 mass % of vinylene carbonate (VC) was added to the nonaqueous electrolyte 4. The proportion of VC added is based on the mass of the nonaqueous electrolyte 4 excluding VC as 100%.

After the elements are assembled, each secondary battery 1 is charged and discharged at 0.2 C, and the inside of the battery case 6 is degassed (primary degassing). Subsequently, the battery is maintained at 40° C. for one day and thus aged, followed by another degassing (secondary degassing). The steps after assembly were performed with the outside of the secondary battery 1 being pressurized at 0.1 MPa in the laminating direction (compressed state).

After the secondary degassing, the battery case 6 is fully sealed to give the secondary battery 1.

[Evaluation]

For evaluation, the secondary battery 1 of each example was maintained at SOC 100% at 60° C. for one month. Subsequently, the amount of gas generated inside was determined. The battery voltage of each battery at SOC 100% is also shown in Table 2.

With respect to the amount of gas generated, first, a predetermined amount of Ar gas is injected and diffused into the battery case 6 with a syringe. Subsequently, the gas in the battery case 6 is extracted with a syringe. Ar and $H_2$ contained in the extracted gas are measured by gas chromatography.

From the amount of Ar and $H_2$ measured and the amount of Ar injected into the battery case 6, the amount of $H_2$ gas generated in the battery case 6 is calculated. The amount of $H_2$ gas generated was taken as the amount of gas generated in the secondary battery 1 and shown in Table 2. Incidentally, in Table 2, the gas generation amount of Example 1 is shown as a value taking the gas generation amount of Comparative Example 2 as 100%. Similarly, the values of Examples 2 to 4 (and Comparative Examples 5 and 6) are shown taking the gas generation amount of Comparative Example 4 as 100%, and the values of Examples 5 and 6 are shown taking the gas generation amount of Comparative Example 7 as 100%.

TABLE 2

| | Positive Electrode Active Material | Negative Electrode Active Material | Amount of Gas Generated (mass %) | Voltage at SOC 100% (V) |
|---|---|---|---|---|
| Example 1 | LFP/C | C | 41 | 4.0 |
| Comparative Example 1 | LFP | C | — | 4.0 |
| Comparative Example 2 | LFP/C | C | 100 | 4.0 |
| Example 2 | LMFP/C | C | 31 | 4.2 |
| Example 3 | LMFP/C | C | 24 | 4.2 |
| Example 4 | LMFP/C | C | 34 | 4.2 |
| Comparative Example 3 | LMFP | C | — | 4.2 |
| Comparative Example 4 | LMFP/C | C | 100 | 4.2 |
| Comparative Example 5 | LMFP/C | C | 106 | 4.2 |
| Comparative Example 6 | NMC | C | 31 | 4.2 |
| Example 5 | NMC | LTO/C | 97 | 2.5 |
| Example 6 | NMC | LTO/C | 14 | 2.5 |
| Comparative Example 7 | NMC | LTO | 100 | 2.5 |

As shown in Table 2, it can be seen that in the secondary batteries 1 using the positive electrode active materials of Examples 1 to 4, the amount of gas generated is significantly lower as compared with the comparative examples. That is, in a positive electrode active material having a core-shell structure, when the shell part thereof is made of a carbon coating precursor including a compound having a specific structure, such a positive electrode active material has a reducing effect on the amount of gas generated in the secondary battery 1.

Moreover, in Example 3, it can be seen that even when the carbon coating precursor is a mixture of a compound having a specific structure and a sugar (sucrose), the same effect as in other examples can be obtained.

That is, when the carbon coating precursor therein includes a compound having a specific structure, such a positive electrode active material has a reducing effect on the amount of gas generated in the secondary battery 1.

In addition, it can be seen that in the secondary batteries 1 using the negative electrode active materials of Examples 5 and 6, the amount of gas generated is significantly lower as compared with the comparative example 7. That is, as with the positive electrode active materials mentioned above, in a negative electrode active material having a core-shell structure, when the shell part thereof is made of a carbon coating precursor including a compound having a specific structure, such a negative electrode active material has a reducing effect on the amount of gas generated in the secondary battery 1.

Moreover, in Example 6, it can be seen that even when the carbon coating precursor is a mixture of a compound having a specific structure and a sugar (sucrose), the same effect as in Example 5 can be obtained.

That is, when a carbon coating precursor includes a compound having a specific structure, a reducing effect on the amount of gas generated in the secondary battery 1 can be obtained.

From the above examples, when the carbon coating precursor therein includes a compound having a specific structure, such a positive electrode active material or negative electrode active material has a reducing effect on the amount of gas generated in the secondary battery 1.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An intermediate product of an electrode active material for a nonaqueous electrolyte secondary battery, the intermediate product of the electrode active material comprising:
    a core part including a carbon-composite inorganic composite oxide; and
    a precursor of a shell part disposed on the core part, the precursor of the shell part comprising a carbon source, the carbon source comprising a component selected from the group consisting of:
        a backbone compound having a heterocyclic group that does not include NH or $NH_2$ as a heteroatom; and
        a sugar compound,
    wherein the precursor of the shell part is configured to be thermally decomposed by heating to a temperature between 600° C. and 800° C. to react the precursor of the shell part with the core part to form a shell part comprising a carbon coating over the core part and to generate the electrode active material having the core part and the shell part, the electrode active material also having a specific surface area of 6.0 $m^2/g$ or more, and
    wherein the electrode active material is at least one of a positive electrode active material and a negative electrode active material.

2. The intermediate product of an electrode active material for a nonaqueous electrolyte secondary battery according to claim 1, wherein:
    the carbon source is a water-soluble compound or an acid-soluble compound.

3. The intermediate product of an electrode active material for a nonaqueous electrolyte secondary battery according to claim 1, wherein:
    the electrode active material has a moisture content of 400 ppm or less, which is measured by a Karl Fischer method such that the electrode active material is heated in a heat-evaporating manner, and continuously maintained at 250° C. for 40 minutes without exposing to an atmosphere after the electrode active material is exposed to the atmosphere to absorb moisture to be saturated.

4. The intermediate product of an electrode active material for a nonaqueous electrolyte second battery according to claim 1, wherein:
    the carbon-composite inorganic composite oxide includes at least one of an inorganic oxide having a polyanion structure, a lithium silicate compound, lithium titanate, tungsten oxide, amorphous tin oxide, and tin silicon oxide.

5. An electrode active material for a nonaqueous electrolyte secondary battery, the electrode active material comprising:

a core part including a carbon-composite inorganic composite oxide; and a shell part comprising a carbon coating on the core part, the electrode active material being generated by thermally decomposing a precursor of a shell part of an intermediate product of the electrode active material, the intermediate product of the electrode active material comprising:

the core part; and the precursor of the shell part disposed on the core part, the precursor of the shell part comprising a carbon source, the carbon source comprising a component selected from the group consisting of a backbone compound having a heterocyclic group that does not include NH or $NH_2$ as a heteroatom and a sugar compound, the thermally decomposing comprising heating the precursor of the shell part to a temperature between 600° C. and 800° C. to react the precursor of the shell part with the core part to form the electrode active material, wherein:

the electrode active material has a specific surface area of 6.0 $m^2$/g or more, the electrode active material has a moisture content of 400 ppm or less, which is measured by a Karl Fischer method such that the electrode active material is heated in a heat-evaporating manner, and continuously maintained at 250° C. for 40 minutes without exposing to an atmosphere after the electrode active material is exposed to the atmosphere to absorb moisture to be saturated, and the electrode active material is at least one of a positive electrode active material and a negative electrode active material.

6. The electrode active material for a nonaqueous electrolyte secondary battery according to claim 5, wherein:

the at least one of a N-free heterocyclic primary amine compound, a N-free heterocyclic secondary amine compound, a N-free heterocyclic tertiary amine compound, a N-free heterocyclic amide group compound, a primary amine backbone compound having an electron donicity lower than a N-containing functional group, a secondary amine backbone compound having an electron donicity lower than a N-containing functional group, a tertiary amine backbone compound having an electron donicity lower than a N-containing functional group, and an amide group backbone compound having an electron donicity lower than a N-containing functional group provides at least one of a water-soluble compound and an acid-soluble compound; and the shell part is made from the at least one of the water-soluble compound and the acid-soluble compound.

7. The electrode active material for a nonaqueous electrolyte secondary battery according to claim 5, wherein:

a whole mass of the electrode active material is defined as 100 mass %;

and a mass of the shell part is in a range between 0.5 mass % and 5.0 mass %.

8. A nonaqueous electrolyte secondary battery comprising:

the electrode active material for a nonaqueous electrolyte secondary battery according to claim 5.

* * * * *